United States Patent
Kupferman

(10) Patent No.: US 7,116,505 B1
(45) Date of Patent: Oct. 3, 2006

(54) REDUCING THE LENGTH OF SERVO-WEDGES IN A DISK DRIVE

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 387 days.

(21) Appl. No.: 10/676,580

(22) Filed: Sep. 30, 2003

(51) Int. Cl.
*G11B 5/09* (2006.01)
*G11B 5/55* (2006.01)

(52) U.S. Cl. ................. 360/48; 360/77.08; 360/78.014
(58) Field of Classification Search ............... 360/73.03
See application file for complete search history.

(56) References Cited

U.S. PATENT DOCUMENTS 6,590,728 B1 * 7/2003 Yang ........................... 360/48

* cited by examiner

*Primary Examiner*—Andrea Wellington
*Assistant Examiner*—Varsha A. Kapadia
(74) *Attorney, Agent, or Firm*—Jonathan E. Prejean, Esq.

(57) ABSTRACT

A method for reducing the length of servo-wedges in a disk drive comprising a concentric tracks, each track comprising embedded servo-wedges each having a track identification field (TIF) and a servo-wedge identification field (WIF), wherein the embedded servo-wedges are grouped into servo-wedge groups comprising a first and second sub-group of servo-wedges. The method includes selecting a servo-wedge from a selected servo-wedge group; storing a first subset of a track identification data (TID) corresponding to a selected track in TIF of selected servo-wedge; storing a second subset of TID in a first portion of WIF of selected servo-wedge if selected servo-wedge is in second sub-group; storing a first wedge identification data (WID) corresponding to selected servo-wedge in a second portion of the WIF if selected servo-wedge is in second sub-group; and storing a second WID corresponding to selected servo-wedge in WIF if selected servo-wedge is in first sub-group.

41 Claims, 3 Drawing Sheets

REDUCING THE LENGTH OF SERVO-WEDGES IN A DISK DRIVE

FIELD OF THE INVENTION

This invention relates to servo-wedges on disks in a disk drive. More particularly, the invention is related to reducing the overhead associated with use of servo-wedges in a disk drive.

BACKGROUND OF THE INVENTION

Disk drives conventionally partition disk surfaces via a series of angularly-spaced embedded servo-wedges disposed on the disk surfaces between data-wedges which contain data tracks with data sectors recorded in the intervals between servo-wedges on each track. The servo-wedges are used in positioning and maintaining a head over a desired track during write and read operations. Typically, servo-wedges are sampled at regular intervals by a read/write channel, and are processed by a servo controller to provide position information to a microprocessor for positioning a head over a desired track.

While the servo-wedges are essential to the operation of the disk drive, their inclusion on the disk surface results in a reduction of the disk surface area available for the data-wedges which in turn translate into a reduction in data capacity of a disk drive. As such, the servo-wedges are considered an overhead in the storage of data on a disk drive. The constant demand for increased data capacity of a disk drive has resulted in an increased number of tracks per inch and/or bits per track on a disk surface. This, however, has also required an increased number of embedded servo-wedges disposed on the disk surface, and thus increased the associated overhead to the disk drive, hindering efforts to maximize the data capacity of a disk drive.

Accordingly, what is needed is a reduction in the overhead associated with the use of embedded servo-wedges on a disk surface of a disk drive.

SUMMARY OF THE INVENTION

This invention can be regarded as a method for reducing the length of the servo-wedge a disk drive comprising a plurality of concentric tracks, each track comprising an embedded servo-wedge having a track identification field and a servo-wedge identification field. The method includes storing a first subset of a track identification data corresponding to a selected track in the track identification field of the servo-wedge of the track; storing a second subset of the track identification data in a first portion of the wedge identification field; and storing a subset of a wedge identification data corresponding to the embedded servo-wedge in a second portion of the wedge identification field.

This invention can also be regarded as a method for reducing the length of a servo-wedge in a disk drive comprising a plurality of concentric tracks, each track comprising a plurality of embedded servo-wedges each having a track identification field and a servo-wedge identification field, wherein the plurality of embedded servo-wedges are grouped into at least one servo-wedge group comprising a first sub-group and a second sub-group of servo-wedges. The method includes selecting a servo-wedge from a selected servo-wedge group; storing a first subset of a track identification data corresponding to a selected track in the track identification field of the selected servo-wedge; storing a second subset of the track identification data in a first portion of the wedge identification field of the selected servo-wedge if the selected servo-wedge is in the second sub-group; storing a first wedge identification data corresponding to the selected servo-wedge in a second portion of the wedge identification field of the selected servo-wedge if the selected servo-wedge is in the second sub-group; and storing a second wedge identification data corresponding to the selected servo-wedge in the wedge identification field of the selected servo-wedge if the selected servo-wedge is in the first sub-group.

This invention can also be regarded as a disk drive comprising a plurality of concentric tracks, each track comprising a plurality of embedded servo-wedges each having a track identification field and a servo-wedge identification field, wherein the plurality of embedded servo-wedges are grouped into at least one servo-wedge group comprising a first sub-group and a second sub-group of servo-wedges. The disk drive further comprises the track identification field adapted to store a first subset of a track identification data corresponding to a selected track in a selected servo-wedge in a selected servo-wedge group.

The wedge identification field further comprises a first portion adapted to store a second subset of the track identification data corresponding to the selected servo-wedge if the selected servo-wedge is in the second sub-group, a second portion adapted to store a first wedge identification data corresponding to the selected servo-wedge if the selected servo-wedge is in the second sub-group, and wherein the wedge identification field is further adapted to store a second wedge identification data corresponding to the selected servo-wedge if the selected servo-wedge is in the first sub-group.

DETAILED DESCRIPTION OF THE INVENTION

Figure 1:
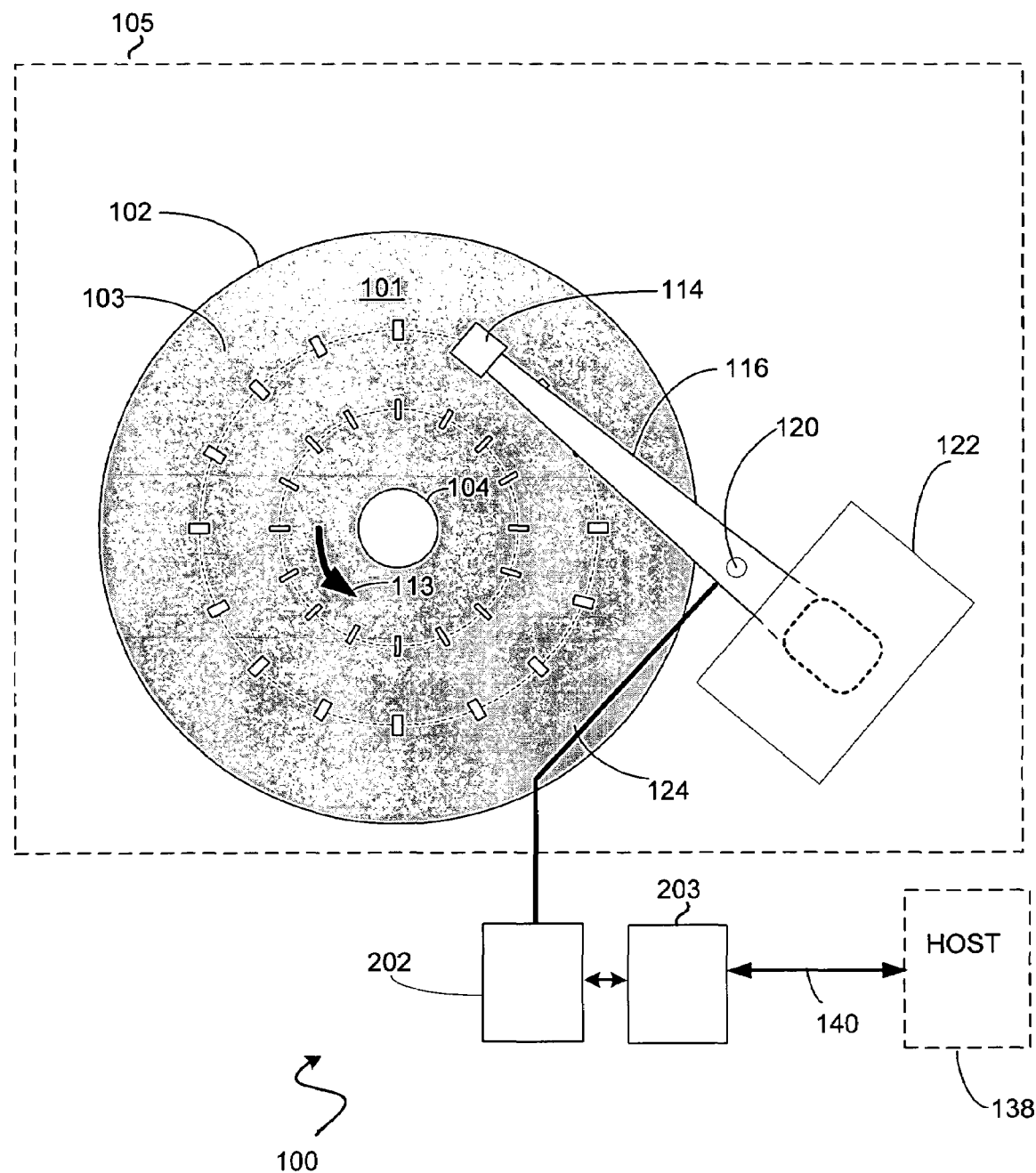
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The HDA 105 further comprises a transducer head 114 mounted on a rotary actuator 116 that rotates about a pivot 120 via controlled torques applied by a voice coil motor 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a control system 202 which can control the movement of the actuator 116 in a manner well known in the art. In addition, the control system 202 sends to and receives signals from the head 114 during read and write operations performed on the disk 102. As also shown in FIG. 1, the control system 202 is interconnected to the interface control system 203 which is in turn interconnected to a host computer 138 by a bus 140 for transferring of data between the hard disk drive 100 and the host 138.

Figure 2:
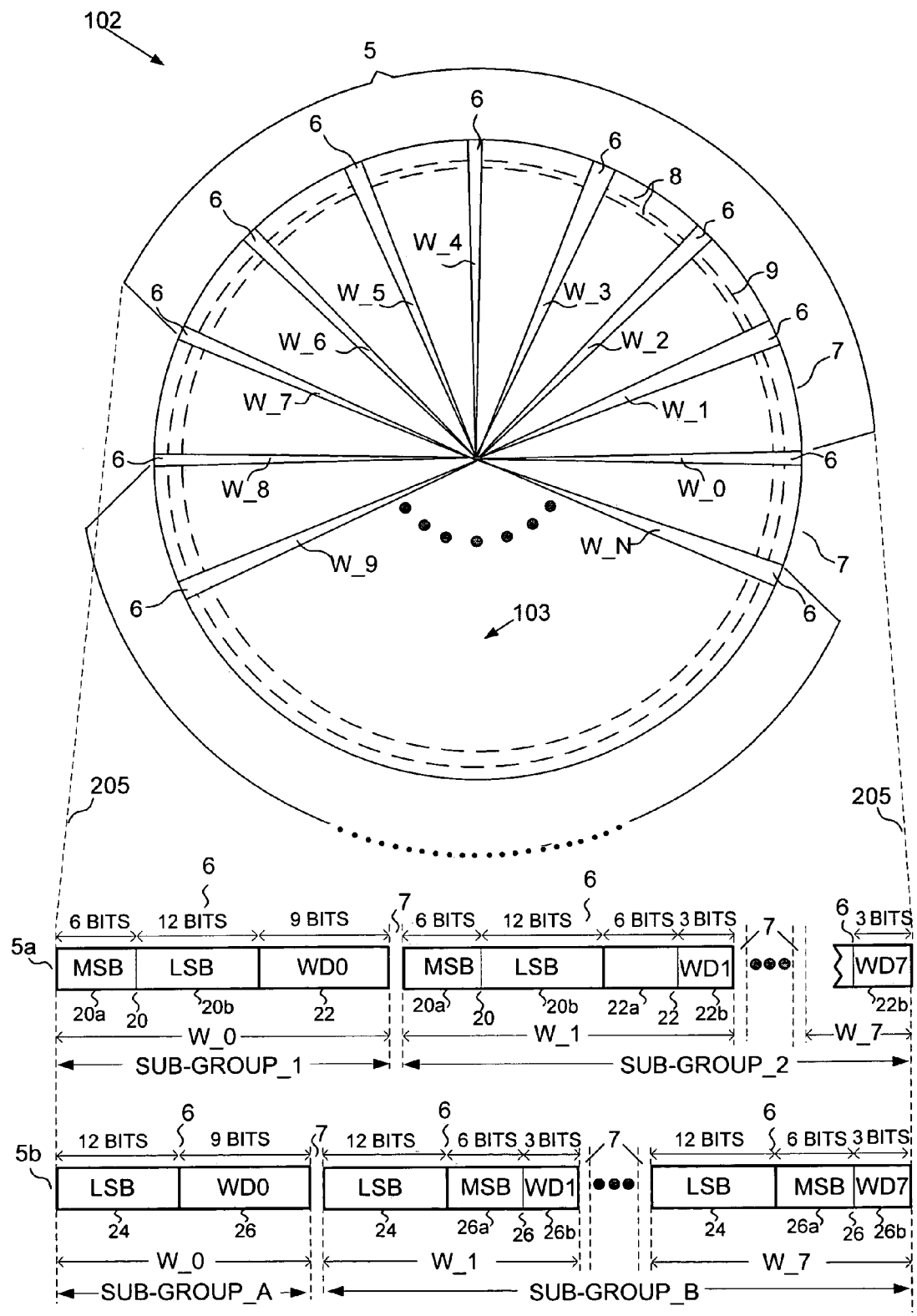
FIG. 2 illustrate a disk formatted for use with a disk drive employing an embodiment of the present invention.

FIG. 2 illustrate a disk 102 formatted for use with the disk drive 100 shown in FIG. 1. The disk 102 has a surface 103 that is partitioned into a series of angularly-spaced embedded servo-wedges 6, such as W_0 through W_N, disposed on the disk surfaces 103 between data-wedges 7 which contain data tracks 8 with data sectors 9 recorded in the intervals between servo-wedges 6 on each track 8. The servo-wedges 6 are used in positioning and maintaining the head 114 over a desired track 8 during write and read operations. In an embodiment of the present invention, each disk surface 103 is logically partitioned into wedge-groups 5, with each wedge-group 5 having the same number of adjacent servo-wedges 6, such as eight, as the other wedge-groups 5.

For ease of illustrating the process of the present invention, an exemplary servo-wedge diagram 5a corresponding to the prior art, and an exemplary servo-wedge diagram 5b corresponding to the present invention is provided in FIG. 2 and used throughout the detailed description. As shown by lines 205, the servo-wedge diagrams 5a and 5b are each a linear representation of the angularly-spaced embedded servo-wedges 6 in a wedge-group 5 of a selected track 8 on the disk surface 103. For exemplary purposes only, each of servo-wedge diagrams 5a and 5b represent a wedge-group 5 having eight servo-wedges 6 (W_0 through W_7), although wedge-groups of the other sizes are also contemplated to be within the scope of the present invention.

In the prior art servo-wedge diagram 5a, each servo-wedge 6 comprises a track identification field 20 and a servo-wedge identification field 22, wherein the servo-wedges 6 are grouped into at least one servo-wedge group 5 comprising a first sub-group of servo-wedges, such as sub-group_1, and a second sub-group of servo-wedges, such as sub-group_2. The determination as to which sub-group a particular servo-wedge 6 belongs is well known in the art and is generally made by obtaining a modulo of the wedge number (e.g. 0 through 7) divided by the number of wedges in the servo-group (e.g. 8), resulting in sub-group_1 comprising a single servo-wedge 6, such as W_0, and the sub-group_2 comprising the remaining seven servo-wedges 6, such as W_1 through W_7 (partially shown) in the servo-group.

As shown, each of track identification fields 20 in sub-group_1 and sub-group_2 comprises 18 bits of track identification data corresponding to the selected track 8 with a most significant bits (MSB) portion 20a of generally 6-bits in length, followed sequentially by a least significant bits (LSB) 20b portion of generally 12 bits in length. The servo-wedge identification field 22 in sub-group_1 and sub-group_2 comprises 9 bits in length. In sub-group_1, the servo-wedge identification field 22 is adapted to store a wedge identification data WD0 of 9 bits in length, containing a full address of the servo-wedge identification data. In sub-group_2, however, each servo-wedge identification field 22 is partitioned into two portions 22a and 22b of 6-bit and 3 bits in length, respectively. Each 3-bits portion 22b is used to store a wedge identification data, such as one of WD1 through WD7 as shown on FIG. 2, each of which is a subset of the 9-bit WD0, suitably an index based on WD0, such as an incremental value added to WD0. The 6-bits portion 22a, however, is left unused. Portions 22a in each of the seven servo-wedge identification fields 22 of sub-group_2 are therefore in essence wasted space on disk surface 103 and contribute to the over-head associated with the use of servo-wedges in on a disk 102.

Figure 3:
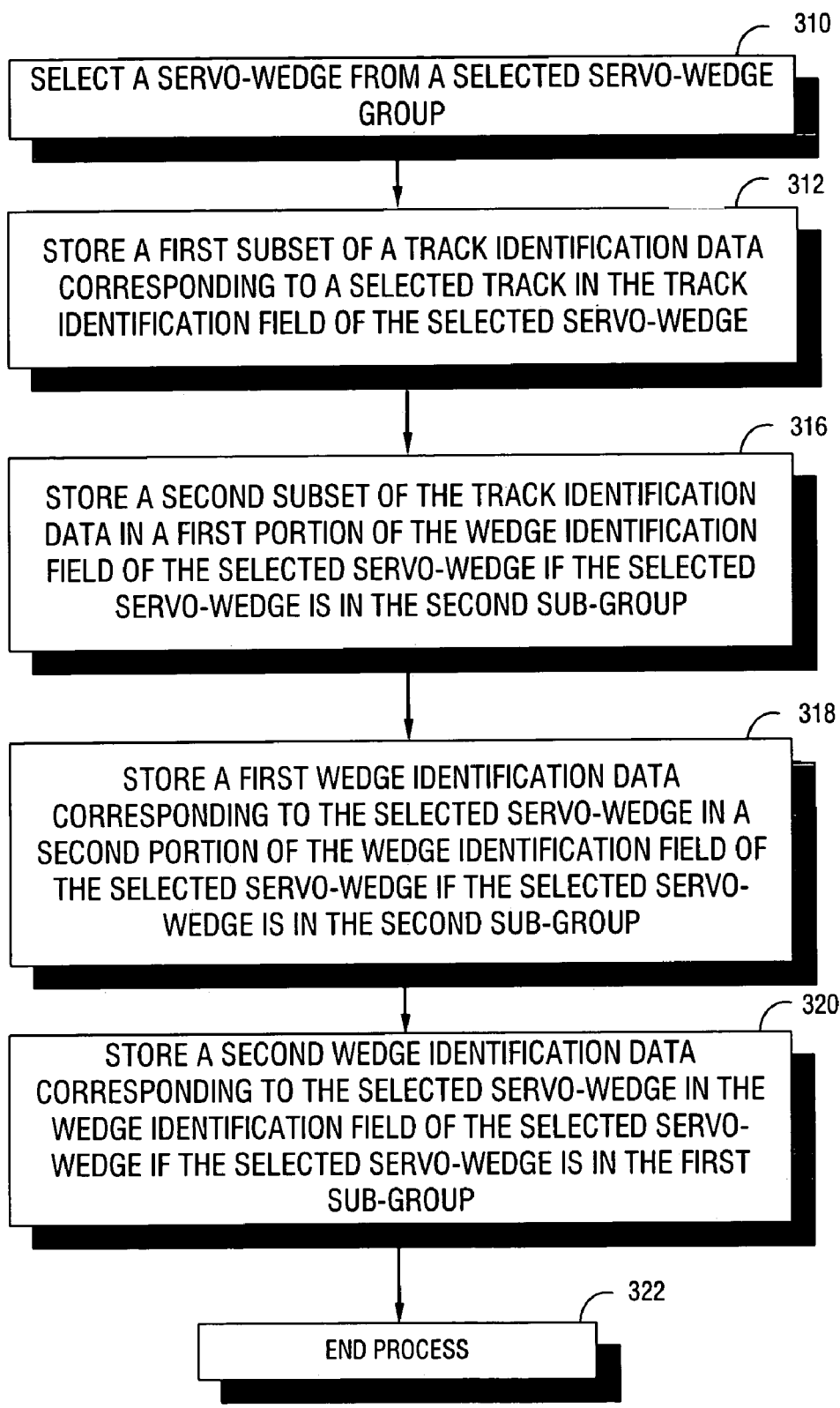
FIG. 3 is a flow chart illustrating a process used in an embodiment of the invention shown in FIG. 2.

FIG. 3 in conjunction with FIG. 2, illustrates a process used in an embodiment of the invention for reducing the overhead associated with the use of embedded servo-wedges 6 on a disk surface 103 of a disk 102. For ease of illustrating the process of the present invention, the above described exemplary servo-wedge diagram 5b corresponding to the present invention is used in conjunction with FIG. 3. In the servo-wedge diagram 5b, each servo-wedge 6 comprises a track identification field 24 and a servo-wedge identification field 26, wherein the servo-wedges 6 are grouped into at least one servo-wedge group 5 comprising a first sub-group of servo-wedges, such as sub-group_A, and a second sub-group of servo-wedges, such as sub-group_B.

The determination as to which sub-group a particular servo-wedge 6 belongs is made by obtaining a modulo of the wedge number (e.g. 0 through 7) divided by the number of wedges in the servo-group (e.g. 8), resulting in sub-group_A comprising a single servo-wedge 6, such as W_0, and the sub-group_B comprising the remaining servo-wedges 6, such as W_1 through W_7, in the servo-group. As shown in FIG. 2, each track identification field 24 in sub-group_A and sub-group_B is adapted to store 12 bits of data. Each servo-wedge identification field 26 in sub-group_A and sub-group_B is adapted to store data up to 9 bits in length. In sub-group_A, the servo-wedge identification field 26 is adapted to store data of 9 bits in length. In sub-group_B, however, each servo-wedge identification field 26 is partitioned into two portions 26a and 26b of 6-bit and 3 bits in length, respectively.

Referencing FIG. 3, the process begins at block 310 in which a servo-wedge 6, such as any one of servo-wedge W_0 through W_7 in diagram 5b, is selected from a servo-wedge group 5. Next in block 312, a first subset of a track identification data corresponding to a selected track 8 is stored in the track identification field 24 of the selected servo-wedge 6. Suitably, the first subset of the track identification data comprises the least significant portions, such as the least significant bits (LSB) of the track identification data, and comprises 12 bits of data.

Next, in block 316, a second subset of the track identification data is stored in a first portion of the wedge identification field 26 of the selected servo-wedge if the selected servo-wedge is in the second sub-group. Suitably, the second subset of the track identification data comprises the most significant portions, such as the most significant bits (MSB) of the track identification data, and comprises 6 bits of data. In the exemplary servo-wedge diagram 5b, if any of the servo-wedges W_1 through W_7 which are in sub-group_B (i.e. the second sub-group) is selected, then the most significant bits (MSB) of the track identification data are is stored in the portion 26a of the servo-wedge identification field 26 of a selected servo-wedge, such as W_1.

Suitably, the second subset of the track identification data is stored sequentially to the first subset of the track identification data, such as shown by portion 26a and track identification field 24 in the exemplary servo-wedge diagram 5b. In addition, the first subset of the track identification data (i.e. the 12 LSB) and the second subset of the track identification data (i.e. the 6 MSB) are suitably each separately encoded with a Gray Code. For example, for a complete 18-bit track identification data represented by the decimal 65536, the process converts the decimal 65536 into hexadecimal FFFF, and then into 16 bits binary string of 1111111111111111. Two zeros are then allocated to left of the 16 bits sequence to generate an 18 bits string of 001111111111111111 that conforms to the 18-bit track identification data storage format. The 18-bits string is then partitioned into two strings of a 6-bits MSB of 001111, and a 12 bits LSB of 111111111111. Encoding each string using Gray Code (well known in the art) results in a 6-bit MSB Gray-encoded string of 001000 that is then stored in portion 26a, and a 12-bit LSB Gray-encoded string of 100000000000 that is then stored in the track identification field 24.

Next, in block 318, a first wedge identification data corresponding to the selected servo-wedge is stored in a second portion of the wedge identification field 26 of the selected servo-wedge if the selected servo-wedge is in the second sub-group. Suitably, the first subset of the wedge identification data comprises the least significant portions of the wedge identification data, and comprises 3 bits of data. In the exemplary servo-wedge diagram 5*b*, if any of the servo-wedges W_1 through W_7 which are in sub-group_B (i.e. the second sub-group) is selected, then the 3-bits portion 22*b* of each servo-wedges is used to store one of WD1 through WD7 wedge identification data as shown on FIG. 2, each of which is a subset of the 9-bit WD0 of portion 24, suitably an index based on WD0, such as an incremental value added to WD0. Suitably, the first wedge identification data is stored sequentially to the second subset of the track identification data, such as shown by portions 26*b* and 26*a* in the exemplary servo-wedge diagram 5*b*.

Next, in block 320, a second wedge identification data corresponding to the selected servo-wedge is stored in the wedge identification field 26 if the selected servo-wedge is in the first sub-group. Suitably, the second wedge identification data comprises 9 bits of data comprising the least significant portions, such as the least significant bits (LSB), and the most significant portions such as the most significant bits (MSB) of the complete wedge identification data. In the exemplary servo-wedge diagram 5*b*, if servo-wedge W_0 which is in sub-group_A (i.e. the first sub-group) is selected, then the most significant bits (MSB) and the least significant bits (LSB) of the wedge identification data (i.e. WD0) are stored in the servo-wedge identification field 26 of the selected servo-wedge W_0. Suitably, each of the first wedge identification data (i.e. WD1 through WD7) is a subset of the second wedge identification data (i.e. WD0) suitably an index based on WD0, such as an incremental value added to WD0, and comprises the least significant portions of WD0.

During the operations of the disk drive 100, the servo-wedges 6 are sampled at regular intervals by a read/write channel (not shown), and are processed by a servo controller (not shown). In the present invention, the servo controller and associated firmware suitably are adapted to provide position information to a microprocessor for positioning a head over a desired track based on first obtaining the least significant bits (LSB) and then the most significant bits (MSB) of the track identification data for each servo-wedges 6 in the sub-group_B of a servo-wedge group. Suitably, a track-estimator subsystem (not shown) well known in the art is used by the servo controller and associated firmware to compensate for lack of the most significant bits (MSB) of the track identification data for each servo-wedges 6 in the sub-group_A of a servo-wedge group.

One advantage of the foregoing feature of the present invention over the prior art is that by reducing the length of the track identification field 24 from 18 bits to just 12 bits in the manner described above, the overall length of a servo-wedges may be reduced. In this way, the present invention provides for a reduction in the overhead associated with the use of embedded servo-wedges on a disk surface of a disk drive.

It should be noted that the various features of the foregoing embodiments were discussed separately for clarity of description only and they can be incorporated in whole or in part into a single embodiment of the invention having all or some of these features.

What is claimed is:

1. In a disk drive comprising a plurality of concentric tracks, each track comprising an embedded servo-wedge having a track identification field and a servo-wedge identification field, a method for reducing the length of the servo-wedge comprising:

storing a first subset of a track identification data corresponding to a selected track in the track identification field of the servo-wedge of the track;

storing a second subset of the track identification data in a first portion of the wedge identification field; and storing a subset of a wedge identification data corresponding to the embedded servo-wedge in a second portion of the wedge identification field, wherein the subset of a wedge identification data is stored sequential to the second subset of the track identification data.

2. The method as defined in claim 1, wherein the first subset of the track identification data comprises the least significant portions of the track identification data.

3. The method as defined in claim 2, wherein the least significant portions of the track identification data comprises 12 bits of data.

4. The method as defined in claim 1, wherein the second subset of the track identification data comprise the most significant portions of the track identification data.

5. The method as defined in claim 4, wherein the most significant portions of the track identification data comprises 6 bits of data.

6. The method as defined in claim 1, wherein the subset of the wedge identification data comprises the least significant portions of the wedge identification data.

7. The method as defined in claim 6, wherein the first portion of the wedge identification field comprises 6 bits and the second portion comprises 3 bits.

8. The method as defined in claim 1, wherein the first subset of the track identification data comprises the least significant portions of the track identification data, wherein the second subset of the track identification data comprise the most significant portions of the track identification data, and wherein the least significant portions and the most significant portions are each separately encoded with a Gray Code.

9. The method as defined in claim 1, wherein the second subset of the track identification data is stored sequential to the first subset of the track identification data.

10. In a disk drive comprising a plurality of concentric tracks, each track comprising a plurality of embedded servo-wedges each having a track identification field and a servo-wedge identification field, wherein the plurality of embedded servo-wedges are grouped into at least one servo-wedge group comprising a first subgroup and a second subgroup of servo-wedges, a method for reducing the length of a servo-wedge comprising:

selecting a servo-wedge from a selected servo-wedge group;

storing a first subset of a track identification data corresponding to a selected track in the track identification field of the selected servo-wedge;

storing a second subset of the track identification data in a first portion of the wedge identification field of the selected servo-wedge if the selected servo-wedge is in the second sub-group;

storing a first wedge identification data corresponding to the selected servo-wedge in a second portion of the wedge identification field of the selected servo-wedge if the selected servo-wedge is in the second sub-group; and storing a second wedge identification data corresponding to the selected servo-wedge in the wedge identification field of the selected servo-wedge if the selected servo-wedge is in the first sub-group.

11. The method as defined in claim 10, wherein the servo-wedges in the least at one servo-wedge group are adjacent servo-wedges.

12. The method as defined in claim 10, wherein the at least one servo-wedge group comprises 8 servo-wedges.

13. The method as defined in claim 10, wherein the first subset of the track identification data comprises the least significant portions of the track identification data.

14. The method as defined in claim 13, wherein the least significant portions of the track identification data comprises 12 bits of data.

15. The method as defined in claim 10, wherein the second subset of the track identification data comprise the most significant portions of the track identification data.

16. The method as defined in claim 15, wherein the most significant portions of the track identification data comprises 6 bits of data.

17. The method as defined in claim 10, wherein the first subset of the wedge identification data comprises the least significant portions of the wedge identification data.

18. The method as defined in claim 17, wherein the wedge identification field comprises 9 bits of data and wherein the first wedge identification data comprises 3 bits of data.

19. The method as defined in claim 10, wherein the second wedge identification data comprises the least significant portions and the most significant portions of the wedge identification data.

20. The method as defined in claim 19, wherein the wedge identification field comprises 9 bits of data and wherein the second wedge identification data comprises 9 bits of data.

21. The method as defined in claim 12, wherein the first sub-group comprises 1 servo-wedge and the second sub-group comprises 7 servo-wedges.

22. The method as defined in claim 10, wherein the first subset of the track identification data comprises the least significant portions of the track identification data, wherein the second subset of the track identification data comprise the most significant portions of the track identification data, and wherein the least significant portions and the most significant portions are each separately encoded with a Gray Code.

23. The method as defined in claim 10, wherein the first wedge identification data is a subset of the second wedge identification data.

24. The method as defined in claim 10, wherein the second subset of the track identification data is stored sequentially to the first subset of the track identification data.

25. The method as defined in claim 10, wherein the first wedge identification data is stored sequential to the second subset of the track identification data.

26. A disk drive comprising a plurality of concentric tracks, each track comprising a plurality of embedded servo-wedges each having a track identification field and a servo-wedge identification field, wherein the plurality of embedded servo-wedges are grouped into at least one servo-wedge group comprising a first subgroup and a second sub-group of servo-wedges, the disk drive further comprises:

the track identification field adapted to store a first subset of a track identification data corresponding to a selected track in a selected servo-wedge in a selected servo-wedge group, and wherein the wedge identification field further comprises:

a first portion adapted to store a second subset of the track identification data corresponding to the selected servo-wedge if the selected servo-wedge is in the second sub-group, a second portion adapted to store a first wedge identification data corresponding to the selected servo-wedge if the selected servo-wedge is in the second subgroup, and wherein the wedge identification field is further adapted to store a second wedge identification data corresponding to the selected servo-wedge if the selected servo-wedge is in the first sub-group.

27. The disk drive as defined in claim 26, wherein the servo-wedges in the least at one servo-wedge group are adjacent servo-wedges.

28. The disk drive as defined in claim 27, wherein the at least one servo-wedge group comprises 8 servo-wedges.

29. The disk drive as defined in claim 26, wherein the first subset of the track identification data comprises the least significant portions of the track identification data.

30. The disk drive as defined in claim 29, wherein the least significant portions of the track identification data comprises 12 bits of data.

31. The disk drive as defined in claim 26, wherein the second subset of the track identification data comprise the most significant portions of the track identification data.

32. The disk drive as defined in claim 31, wherein the most significant portions of the track identification data comprises 6 bits of data.

33. The disk drive as defined in claim 26, wherein the first subset of the wedge identification data comprises the least significant portions of the wedge identification data.

34. The disk drive as defined in claim 33, wherein the wedge identification field comprises 9 bits of data and wherein the first wedge identification data comprises 3 bits of data.

35. The disk drive as defined in claim 26, wherein the second wedge identification data comprises the least significant portions and the most significant portions of the wedge identification data.

36. The disk drive as defined in claim 35, wherein the wedge identification field comprises 9 bits of data and wherein the second wedge identification data comprises 9 bits of data.

37. The disk drive as defined in claim 28, wherein the first sub-group comprises 1 servo-wedge and the second sub-group comprises 7 servo-wedges.

38. The disk drive as defined in claim 26, wherein the first subset of the track identification data comprises the least significant portions of the track identification data, wherein the second subset of the track identification data comprise the most significant portions of the track identification data, and wherein the least significant portions and the most significant portions are each separately encoded with a Gray Code.

39. The disk drive as defined in claim 26, wherein the first wedge identification data is a subset of the second wedge identification data.

40. The disk drive as defined in claim 26, wherein the second subset of the track identification data is stored sequentially to the first subset of the track identification data.

41. The disk drive as defined in claim 26, wherein the first wedge identification data is stored sequential to the second subset of the track identification data.

* * * * *